(12) United States Patent
Lee et al.

(10) Patent No.: US 10,632,970 B2
(45) Date of Patent: Apr. 28, 2020

(54) VEHICLE AND CONTROL METHOD THEREOF

(71) Applicants: Hyundai Motor Company, Seoul (KR); Kia Motors Corporation, Seoul (KR)

(72) Inventors: Jihye Lee, Gyeonggi-Do (KR); Dong June Song, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/210,657

(22) Filed: Dec. 5, 2018

(65) Prior Publication Data

US 2020/0062218 A1 Feb. 27, 2020

(30) Foreign Application Priority Data

Aug. 23, 2018 (KR) .................. 10-2018-0098424

(51) Int. Cl.
| | | |
|---|---|---|
| G05B 19/00 | (2006.01) |
| B60R 25/25 | (2013.01) |
| B60W 40/08 | (2012.01) |
| G07C 9/00 | (2020.01) |

(52) U.S. Cl.
CPC ............ *B60R 25/25* (2013.01); *B60W 40/08* (2013.01); *G07C 9/00309* (2013.01); *B60W 2040/0809* (2013.01); *G07C 2009/00325* (2013.01); *G07C 2009/00547* (2013.01)

(58) Field of Classification Search
None
See application file for complete search history.

(56) References Cited

U.S. PATENT DOCUMENTS

| | | | |
|---|---|---|---|
| 2012/0092128 A1 | 4/2012 | Yamane et al. | |
| 2016/0012653 A1* | 1/2016 | Soroko .............. | G07C 9/00007 340/5.61 |
| 2016/0092950 A1* | 3/2016 | Driscoll ............. | G06Q 30/0633 705/26.8 |

FOREIGN PATENT DOCUMENTS

| | | |
|---|---|---|
| JP | 2014227741 A | 12/2014 |
| KR | 10-2014-0083796 A | 7/2014 |
| KR | 10-2015-0108027 A | 9/2015 |
| KR | 101777340 B1 | 9/2017 |

* cited by examiner

*Primary Examiner* — Adolf Dsouza
(74) *Attorney, Agent, or Firm* — Mintz Levin Cohn Ferris Glovsky and Popeo, P.C.; Peter F. Corless

(57) ABSTRACT

A vehicle may include: a communication device configured to communicate with a remote control device; a biometric information detector configured to detect biometric information; and a controller configured to authenticate a user based on at least one of the detected biometric information and a signal received by the communication device from the remote control device. When biometric information of the user is detected, the controller may be configured to determine whether to activate the remote control device based on a location of the remote control device.

16 Claims, 7 Drawing Sheets

VEHICLE AND CONTROL METHOD THEREOF

CROSS-REFERENCE TO RELATED APPLICATION

This application is based on and claims priority under 35 U.S.C. § 119 to Korean Patent Application No. 10-2018-0098424, filed on Aug. 23, 2018 in the Korean Intellectual Property Office, the disclosure of which is incorporated herein by reference in its entirety.

BACKGROUND

1. Field of the Disclosure

The present disclosure relates generally to a vehicle and control method thereof and, more particularly, to a vehicle and control method thereof for providing a person a right to access the vehicle based on biometric information.

2. Discussion of Related Art

Car sharing has become popular in recent times. In this regard, user authentication is essential for protecting cars being shared from theft.

Conventional user authentication technologies utilize a basic authentication method to authenticate a user by comparing a password entered by the user, e.g., through a keypad, with a password stored in advance. With the advancement of authentication technologies, user identification or authentication techniques that use biological characteristics, such as gene signature, fingerprint, voice, vein, facial feature, iris, etc., for more accurate authentication have become commercialized.

Among these techniques, the most commonly used authentication technique today is an authentication method that uses biometric information of the user, e.g., a fingerprint-based authentication method. In this method, biometric information of a user is stored in a vehicle or a server in advance. When the user attempts to access the vehicle, biometric information of the user detected by the vehicle and the pre-stored biometric information stored are compared together to authenticate the user.

SUMMARY OF THE DISCLOSURE

Embodiments of the present disclosure provide a vehicle and control method thereof, by which a traditional remote control device may be used to give a right to access a vehicle to a person who requires a right to control the vehicle based on biometric information.

In accordance with embodiments of the present disclosure, a vehicle may include: a communication device configured to communicate with a remote control device; a biometric information detector configured to detect biometric information; and a controller configured to authenticate a user based on at least one of the detected biometric information and a signal received by the communication device from the remote control device. When biometric information of the user is detected, the controller may be configured to determine whether to activate the remote control device based on a location of the remote control device.

When the biometric information of the user is detected, the controller may determine whether to activate the remote control device based on a door-lock state of the vehicle and the location of the remote control device.

The controller may deactivate the remote control device, when the biometric information of the user is detected, a door-lock command of the vehicle is entered, and the remote control device is determined to be inside of the vehicle.

The controller may activate or deactivate the remote control device by activating or deactivating the communication device.

The controller may activate the remote control device, when the biometric information of the user is detected, a door-lock command of the vehicle is entered, and the remote control device is determined to be outside of the vehicle.

The controller may activate the remote control device, when the biometric information of the user is detected, a door unlock command of the vehicle is entered, and the remote control device is determined to be outside of the vehicle.

The controller may activate or deactivate the remote control device based on the determination of whether to activate the remote control device, when the biometric information of the user is detected and the authentication of the user is successful.

The biometric information may include at least one of fingerprint information, iris information, and facial information of the user.

The biometric information detector may be installed at one or more locations of the vehicle including a start button, a key fob, a door, a center fascia, and a handle of the vehicle.

The vehicle may further include a storage configured to store the biometric information of the user.

Furthermore, in accordance with embodiments of the present disclosure, a control method of a vehicle may include: detecting, by a biometric information detector of the vehicle, biometric information; receiving, by a communication device of the vehicle, a signal from a remote control device; authenticating, by a controller of the vehicle, the user based on at least one of the detected biometric information and the signal received by the communication device from the remote control device; and determining, by the controller, whether to activate the remote control device based on a location of the remote control device when biometric information of the user is detected.

The determining of whether to activate the remote control device may include determining, by the controller, whether to activate the remote control device based on a door-lock state of the vehicle and the location of the remote control device when the biometric information of the user is detected.

The control method may further include deactivating, by the controller, the remote control device when the biometric information of the user is detected, a door-lock command of the vehicle is entered, and the remote control device is determined to be inside of the vehicle.

The control method may further include activating or deactivating, by the controller, the remote control device by activating or deactivating the communication device.

The control method may further include activating, by the controller, the remote control device when the biometric information of the user is detected, a door-lock command of the vehicle is entered, and the remote control device is determined to be outside of the vehicle.

The control method may further include activating, by the controller, the remote control device when the biometric information of the user is detected, a door unlock command of the vehicle is entered, and the remote control device is determined to be outside of the vehicle.

The control method may further include activating or deactivating, by the controller, the remote control device based on the determination of whether to activate the remote control device when the biometric information of the user is detected and the authentication of the user is successful.

The biometric information may include at least one of fingerprint information, iris information, and facial information of a user.

The biometric information detector may be installed at one or more locations of the vehicle including a start button, a key fob, a door, a center fascia, and a handle of the vehicle.

The control method may further include storing, by a storage, the biometric information of the user.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The principle and embodiments of the present disclosure will now be described with reference to accompanying drawings.

Figure 1:
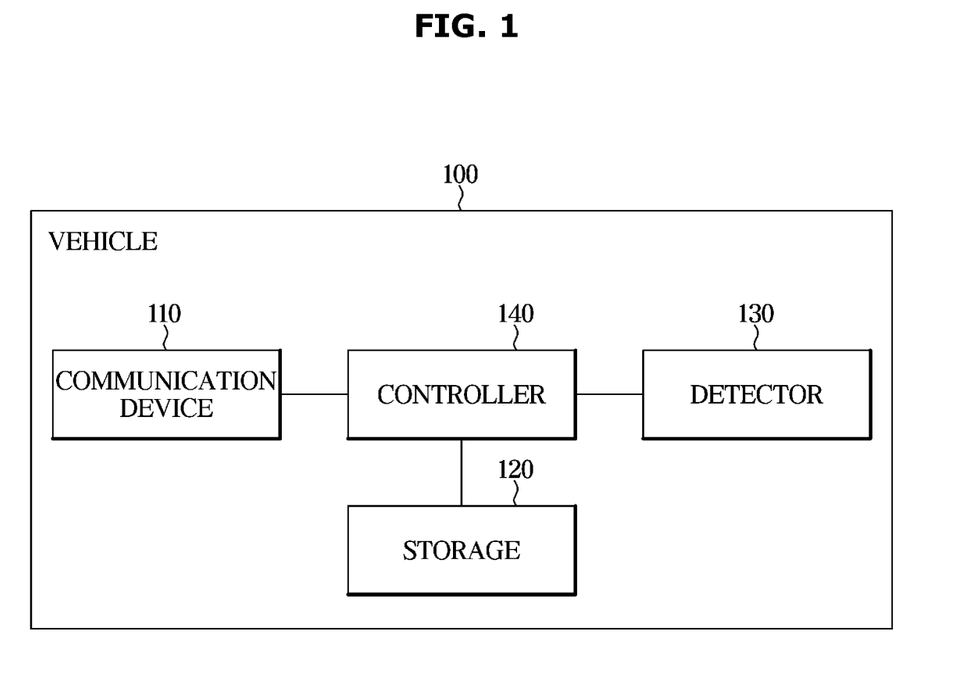
FIG. 1 is a control block diagram of a vehicle according to embodiments of the present disclosure.
Figure 2:
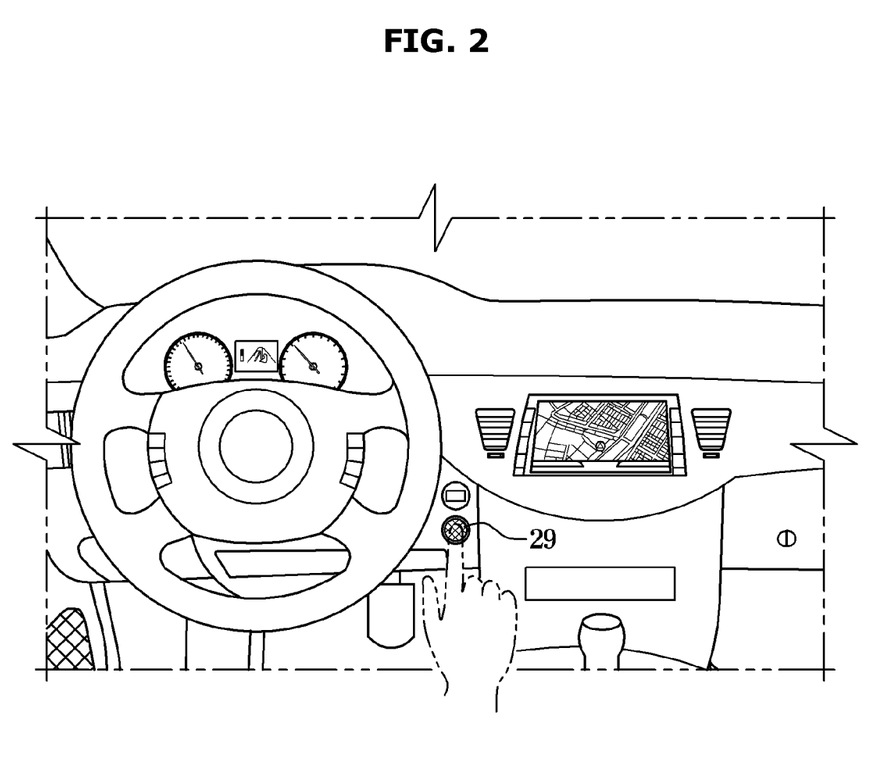
FIGS. 2 to 4 show various points where a biometric information detector may be provided.
Figure 3:
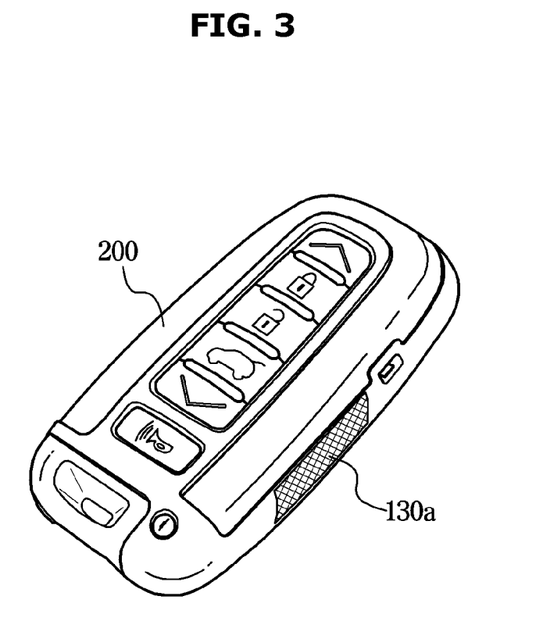
Figure 4:
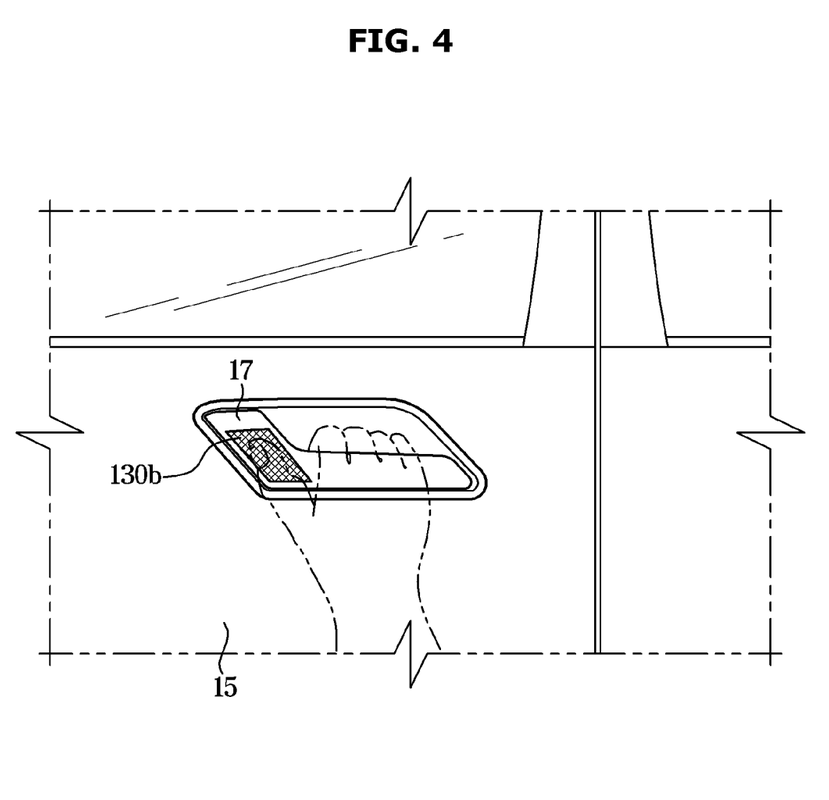

FIG. 1 is a control block diagram of a vehicle according to embodiments of the present disclosure, and FIGS. 2 to 4 show various points where a biometric information detector may be provided.

As shown in FIG. 1, a vehicle 100 in accordance with an embodiment of the present disclosure may include a communication device 110 for sending or receiving signals with an external device, a storage 120 for storing various information about the vehicle 100 including biometric information of a user, a biometric information detector (alternatively referred to herein as "detector") 130 for detecting and acquiring biometric information of a user, and a controller 140 for controlling various devices in the vehicle 100 and giving a user a right to control the vehicle 100 based on biometric information acquired by the biometric information detector 130.

The communication device 110 may communicate, i.e., exchange various signals, with an external device. Specifically, the communication device 110 communicates with a remote control device 200, which is given a right to control the vehicle 100, over a wireless communication network to perform a mutual authentication procedure with the remote control device 200.

For example, the communication device 110 may be connected to the remote control device 200 via a low frequency (LF) communication network or a radio frequency (RF) communication network.

According to embodiments of the present disclosure, the remote control device 200 may be implemented by a computer or portable terminal that may be able to access the vehicle 100 over a wireless communication network. The computer may include e.g., a notebook, laptop, tablet personal computer (tablet PC), slate PC, etc., having a WEB browser installed therein, and the portable terminal may be a wireless communication device that guarantees portability and mobility, including any type of handheld based wireless communication device, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000 device, a Code Division Multiple Access (CDMA)-2000 device, a W-CDMA device, a Wireless Broadband Internet (WiBro) terminal, a smart phone, etc., a wearable device, such as a watch, a ring, a bracelet, a necklace, glasses, a contact lens, a head mounded device (HMD), etc., or a key fob.

The LF communication network is a communication network having a low frequency band of less than 300 kHZ, for example a frequency band ranging from about 20 kHz to about 150 kHz, used by the vehicle 100 to scan the remote control device 200. In the case of exchanging LF signals over the LF communication network, due to the low frequency band properties, a possible range of signal transmission and reception is short as compared with that of the RF communication network having a high frequency band. For example, the possible range of LF signal transmission and reception may be about 5 m, while the possible range of RF signal transmission and reception may be about 100 m.

Accordingly, the vehicle 100 may be able to scan the remote control device 200 located near the vehicle 100 or request information required for authentication of the scanned remote control device 200 by transmitting LF signals over the LF communication network.

To transmit the LF signal, the vehicle 100 may include one or more LF antennas.

The RF communication network is a communication network for wireless signals sent in a high frequency band of 300 kHz or more, for example, an ultra-high frequency (UHF) band ranging from about 300 MHz to 3 GHz, more specifically, from about 300 MHz to about 450 MHz. In the case of exchanging RF signals over the RF communication network, a possible range of signal transmission and reception is long as compared with that of the LF communication network having a low frequency band.

To transmit the RF signal, the vehicle 100 may include one or more RF antennas.

The communication device 110 may be activated or deactivated by the controller 140, and when activated, send an authentication request signal and receive an authentication signal to perform an authentication procedure with the remote control device 200.

The storage 120 may store various information including biometric information of a user.

Specifically, the storage 120 may store biometric information of a registered user.

Furthermore, the storage 120 may store authentication data of the registered remote control device 200.

The storage 120 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto.

The storage 120 may be a memory implemented with a chip separate from a processor, which will be described later, in relation to the controller 140, or may be implemented integrally with the processor in a single chip.

The biometric information detector 130 may detect and acquire biometric information of a user.

Specifically, the biometric information detector 130 may detect and acquire biometric information of a user through sensors (not shown) installed at various points in the vehicle 100, and send the biometric information to the controller 140.

Throughout the specification, for convenience of explanation, a fingerprint will be taken as an example of biometric information of a user, but the biometric information is not limited to the fingerprint but may include anything that may represent a biological characteristic, such as gene signature, voice, vein, facial information, iris information, etc.

The biometric information detector 130 may include various elements to detect and acquire the biometric information of a user. For example, the biometric information detector 130 may include a fingerprint sensor to acquire fingerprint information of a user, or face or iris sensors to acquire the facial information of a user. It is not limited thereto, and any element that may be able to acquire the biometric information of a user may be included in the biometric information detector 130.

The sensor may be installed on a start button 29 of the vehicle 100 as shown in FIG. 2, and/or on a side 130*a* of the remote control device 200 as shown in FIG. 3. Furthermore, the sensor may be installed on a side 130*b* of a handle 17 of a door 15, as shown in FIG. 4, to detect and acquire the biometric information of a user.

The controller 140 may control each of components included in the vehicle 100.

Specifically, the controller 140 may compare biometric information of a user acquired by the biometric information detector 130 with the biometric information stored in the storage 120, authenticate the user who performs fingerprint authentication when the detected information and the stored information are matched, and give the user at least one of rights to lock or unlock the door 150 and a trunk of the vehicle 100 and turn on or off the ignition of the vehicle 100.

Furthermore, the controller 140 may determine a locked state of the door 15. For example, the controller 140 may determine a locked state of the door 15 based on whether there is an input to a door-lock input part or a door-unlock input part arranged around the handle 17 of the door 15 and/or based on a detection signal from a lock-detecting sensor separately provided, and these techniques are well-known to the public, so the detailed description thereof will be omitted.

The door-lock input part and the door-unlock input part may each be integrated with the biometric information detector 130, so that the user may input both biometric information and a door-lock command while inputting the biometric information to the door-lock input part, and input both biometric information and a door unlock command while inputting the biometric information to the door-unlock input part.

Furthermore, the controller 140 may activate the communication device 110 to perform an authentication procedure with the remote control device 200, and control the communication device 110 to send an authentication request signal to the remote control device 200 or to receive an authentication signal from the remote control device 200.

Moreover, the controller 140 may determine whether authentication data of the remote control device 200 included in the authentication signal matches authentication data stored in the storage 120, and authorize the remote control device 200 based on successful matching.

The controller 140 may determine where the remote control device 200 is. For example, the controller 140 may determine whether the remote control device 200 is located inside or outside the vehicle 100 based on receive strength and direction of a signal received from the remote control device 200 and may further determine whether the remote control device 200 is located outside but in a near range (i.e., in a range allowing authentication) from the vehicle 100.

The controller 140 may also determine whether the remote control device 200 is activated. When the remote control device 200 is activated, the controller 140 may give at least one of rights to lock or unlock the door 15 and trunk of the vehicle 100 and turn on or off the ignition of the vehicle 100 to the remote control device 200, and when the remote control device 200 is deactivated, the controller 140 may deprive the remote control device 200 of the right to control the vehicle 100.

The controller 140 may activate or deactivate the remote control device 200 according to predetermined logic.

Activating or deactivating the remote control device 200 may include activating or deactivating the communication device 110 that communicates with the remote control device 200.

As described above, the controller 140 may be implemented with a memory (not shown) storing an algorithm to control operation of the components in the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

Operation of each component of the vehicle 100 in accordance with an embodiment will now be described in connection with FIG. 5.

Figure 5:
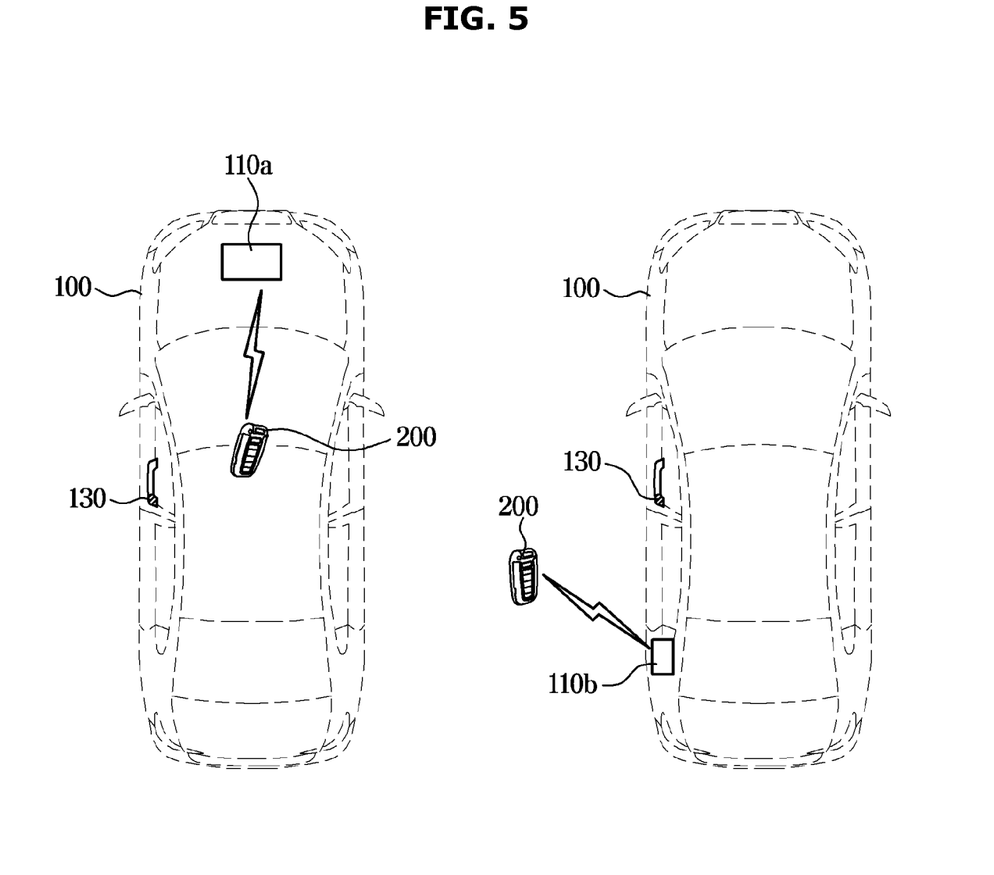
FIG. 5 is a diagram for explaining a process of sending or receiving signals between a vehicle and a remote control device according to embodiments of the present disclosure.

FIG. 5 is a diagram for explaining a process of sending or receiving signals between a vehicle and a remote control device according to embodiments of the present disclosure.

The communication device 110 of the vehicle 100 may include a plurality of antennas 110a and 110b. The controller 140 may determine whether the remote control device 200 is located inside the vehicle 100 and further whether the remote control device 200 is located outside the vehicle 100 but in a near range from the vehicle 100, based on strength of the signals sent or received through the plurality of antennas 110a and 110b.

When it is determined that the remote control device 200 is located inside the vehicle 100, the biometric information detector 130 has received biometric information, and a door-lock command is entered to the door-lock input part, the controller 140 may deactivate the remote control device 200 for the user to control the vehicle 100 through fingerprint authentication.

When it is determined that the remote control device 200 is located outside the vehicle 100, the biometric information detector 130 has received biometric information, and a door unlock command is entered to the door-unlock input part, the controller 140 activate the remote control device 200 located outdoors for the user to control the vehicle 100 through fingerprint authentication as well as with the remote control device 200.

At least one component may be added or omitted to correspond to the performance of the components of the vehicle 100 shown in FIG. 1. Furthermore, it will be obvious to the ordinary skilled people in the art that the relative positions of the components may be changed to correspond to the system performance or structure.

Some components of the vehicle 100 shown in FIG. 1 may be implemented in software, or hardware such as Field Programmable Gate Arrays (FPGAs) and Application Specific Integrated Circuits (ASICs).

Figure 6:
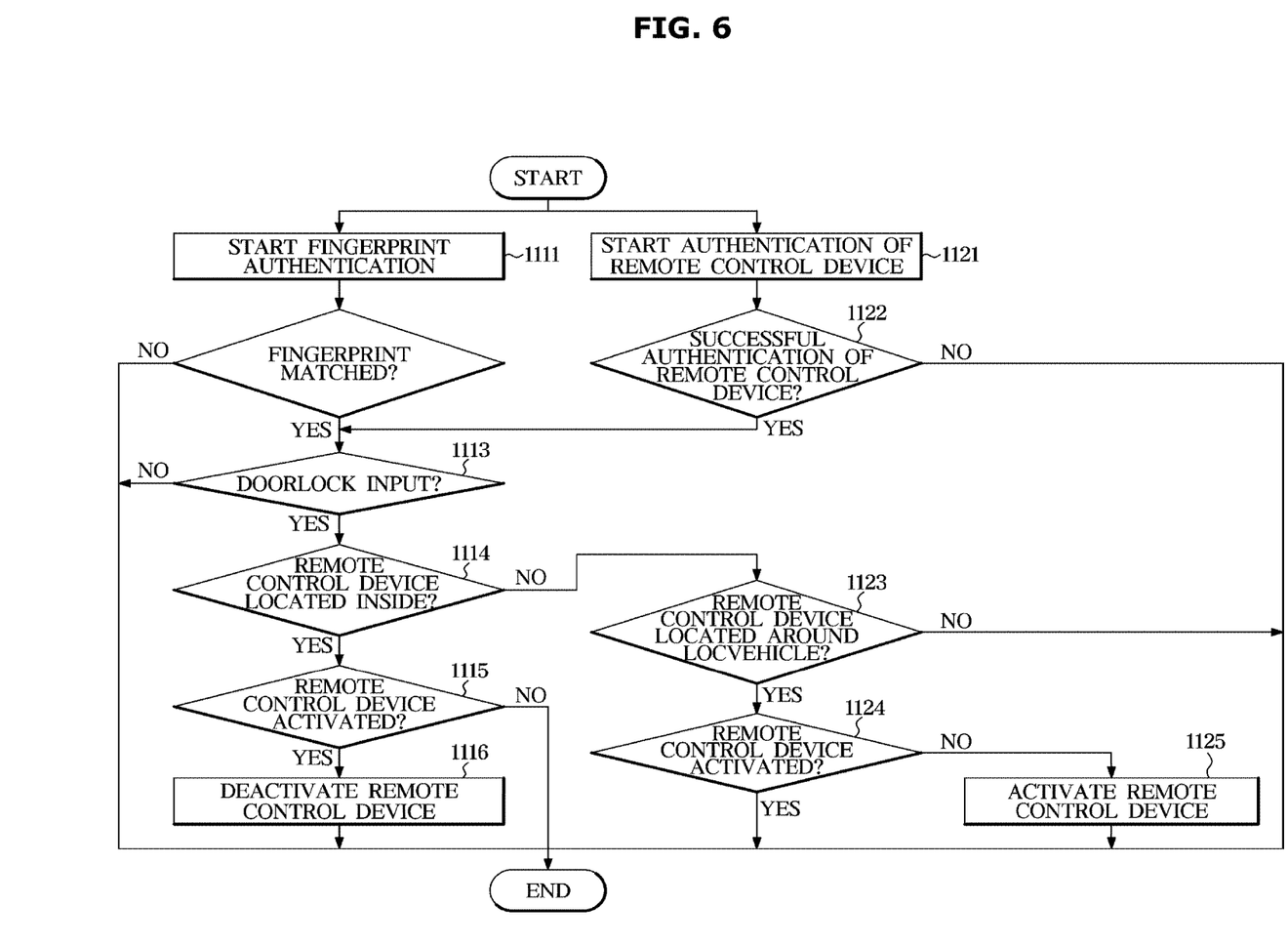
FIGS. 6 and 7 are flowcharts illustrating a control method of a vehicle, according to embodiments of the present disclosure.
Figure 7:
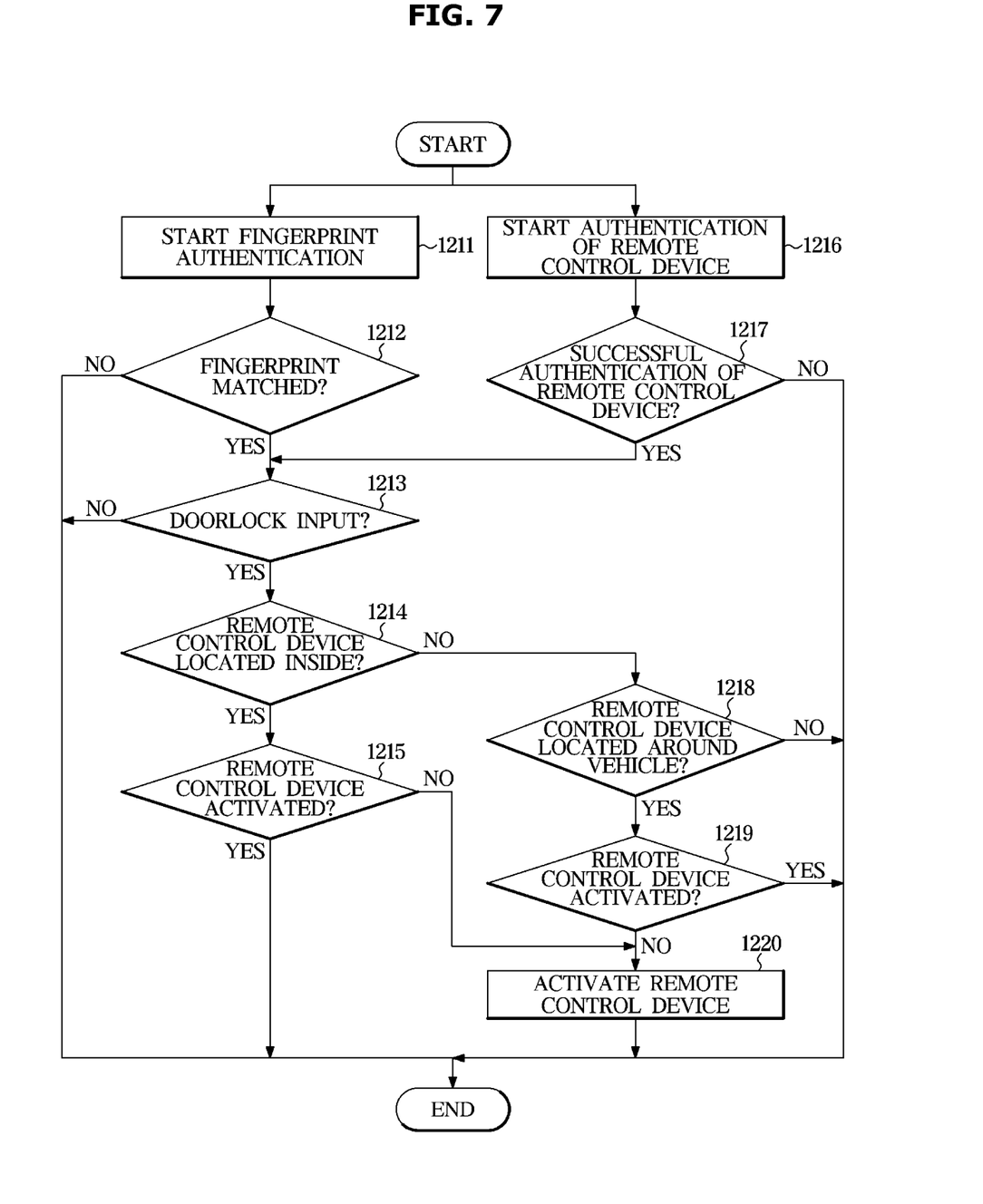

A control method of a vehicle in accordance with embodiments will be described in detail in connection with FIGS. 6 and 7. FIGS. 6 and 7 are flowcharts illustrating a control method of a vehicle according to embodiments of the present disclosure.

Although fingerprint information is taken as an example of the biometric information in the following description in connection with FIGS. 6 and 7, the biometric information is not limited thereto but may include various information as described above.

Referring first to FIG. 6, when fingerprint information is input through the biometric information detector 130 in 1111, the controller 140 of the vehicle 100 determines whether the input fingerprint information matches fingerprint information stored in the storage 120 in 1112, and if the input fingerprint information and the stored fingerprint information are matched, determines whether a door-lock command is entered by the user in 1113.

When the door-lock command is entered (yes in 1113), the controller 140 determines whether the remote control device 200 is located inside the vehicle 100 in 1114, and when the remote control device 200 is located inside the vehicle 100 (yes in 1114), determines whether the remote control device 200 is activated in 1115. When the remote control device 200 is activated, the controller 140 deactivates the remote control device 200 in 1116.

Otherwise, if the remote control device 200 is located outside but in a near range from the vehicle 100 (yes in 1123), the controller 140 determines whether the remote control device 200 is activated in 1124, and when the remote control device 200 is deactivated (no in 1124), activates the remote control device 200 in 1125.

The vehicle 100 starts authenticating the remote control device 200 targeted for the activation or deactivation in 1121, and if the authentication is successful, the remote control device 200 is authorized (yes in 1122).

Referring next to FIG. 7, when fingerprint information is input through the biometric information detector 130 in 1211, the input fingerprint information matches fingerprint information stored in the storage 120 (yes in 1212), and a door unlock command is entered (yes in 1213), the controller 140 determines whether the remote control device 200 is located inside the vehicle 100 in 1214, and when the remote control device 200 is located inside the vehicle 100 (yes in 1214), determines whether the remote control device 200 is activated in 1215. When the remote control device 200 is deactivated (no in 1215), the controller 140 activates the remote control device 200 in 1220.

Otherwise, if the remote control device 200 is located outside but in a near range from the vehicle 100 (yes in 1218), the controller 140 determines whether the remote control device 200 is activated in 1219, and when the remote control device 200 is deactivated (no in 1219), activates the remote control device 200 in 1220.

The vehicle 100 starts authenticating the remote control device 200 targeted for the activation or deactivation in 1221, and if the authentication is successful, the remote control device 200 is authorized (yes in 1217).

According to embodiments of the present disclosure, even for a vehicle that requires biometric information, a traditional remote control device may be used to easily and safely provide a right to access the vehicle to a person who wants to temporarily use the vehicle.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
    a communication device configured to communicate with a remote control device;
    a biometric information detector configured to detect biometric information; and
    a controller configured to authenticate a user based on at least one of the detected biometric information and a signal received by the communication device from the remote control device,
    wherein, when biometric information of the user is detected, the controller is configured to determine whether to activate the remote control device based on a location of the remote control device,
    wherein the controller is configured to deactivate the remote control device when the biometric information of the user is detected, a door-lock command of the vehicle is entered, and the remote control device is determined to be inside of the vehicle, and
    wherein the controller is configured to activate the remote control device when the biometric information of the user is detected, the door-lock command of the vehicle is entered, and the remote control device is determined to be outside of the vehicle.

2. The vehicle of claim 1, wherein, when the biometric information of the user is detected, the controller is configured to determine whether to activate the remote control device based on a door-lock state of the vehicle and the location of the remote control device.

3. The vehicle of claim 1, wherein the controller is configured to activate or deactivate the remote control device by activating or deactivating the communication device.

4. The vehicle of claim 1, wherein the controller is configured to activate the remote control device, when the biometric information of the user is detected, a door unlock command of the vehicle is entered, and the remote control device is determined to be outside of the vehicle.

5. The vehicle of claim 1, wherein the controller is configured to activate or deactivate the remote control device based on the determination of whether to activate the remote control device, when the biometric information of the user is detected and the authentication of the user is successful.

6. The vehicle of claim 1, wherein the biometric information includes at least one of fingerprint information, iris information, and facial information of the user.

7. The vehicle of claim 1, wherein the biometric information detector is installed at one or more locations of the vehicle including a start button, a key fob, a door, a center fascia, and a handle of the vehicle.

8. The vehicle of claim 1, further comprising a storage configured to store the biometric information of the user.

9. A control method of a vehicle, the control method comprising:
    detecting, by a biometric information detector of the vehicle, biometric information;
    receiving, by a communication device of the vehicle, a signal from a remote control device;
    authenticating, by a controller of the vehicle, the user based on at least one of the detected biometric information and the signal received by the communication device from the remote control device;
    determining, by the controller, whether to activate the remote control device based on a location of the remote control device when biometric information of the user is detected;
    deactivating, by the controller, the remote control device when the biometric information of the user is detected, a door-lock command of the vehicle is entered, and the remote control device is determined to be inside of the vehicle; and
    activating, by the controller, the remote control device when the biometric information of the user is detected, the door-lock command of the vehicle is entered, and the remote control device is determined to be outside of the vehicle.

10. The control method of claim 9, wherein the determining of whether to activate the remote control device comprises determining, by the controller, whether to activate the remote control device based on a door-lock state of the vehicle and the location of the remote control device when the biometric information of the user is detected.

11. The control method of claim 9, further comprising activating or deactivating, by the controller, the remote control device by activating or deactivating the communication device.

12. The control method of claim 9, further comprising activating, by the controller, the remote control device when the biometric information of the user is detected, a door unlock command of the vehicle is entered, and the remote control device is determined to be outside of the vehicle.

13. The control method of claim 9, further comprising activating or deactivating, by the controller, the remote control device based on the determination of whether to activate the remote control device when the biometric information of the user is detected and the authentication of the user is successful.

14. The control method of claim 9, wherein the biometric information includes at least one of fingerprint information, iris information, and facial information of a user.

15. The control method of claim 9, wherein the biometric information detector is installed at one or more locations of the vehicle including a start button, a key fob, a door, a center fascia, and a handle of the vehicle.

16. The control method of claim 9, further comprising storing, by a storage, the biometric information of the user.

* * * * *